United States Patent [19]

Amey

[11] 4,164,237

[45] Aug. 14, 1979

[54] FUEL PRESSURE REGULATOR ASSEMBLY

[75] Inventor: Arnold Amey, Otisville, Mich.

[73] Assignee: Tom McGuane Industries, Inc., Madison Heights, Mich.

[21] Appl. No.: 881,063

[22] Filed: Feb. 24, 1978

[51] Int. Cl.[2] .................... F16K 31/12

[52] U.S. Cl. .................... 137/510; 251/332; 251/360

[58] Field of Search .................... 251/332, 360; 137/510

[56] References Cited

U.S. PATENT DOCUMENTS

| | | | |
|---|---|---|---|
| 2,835,269 | 5/1958 | Seymour | 251/332 X |
| 2,852,038 | 9/1958 | Holsclaw | 251/360 X |
| 3,511,270 | 5/1970 | Fehrenbach | 137/510 |

*Primary Examiner*—Harold W. Weakley

*Attorney, Agent, or Firm*—Barnes, Kisselle, Raisch & Choate

[57] ABSTRACT

A fuel pressure regulator assembly comprising, a housing, a diaphragm separating the housing into a first and second chamber, the housing has a radial inlet extending to the first chamber and a connector having an axial outlet is mounted in the housing and extends axially into the first chamber. The connector has an annular groove adjacent its inner end that faces radially outwardly and a sealing ring is positioned in the groove. The sealing ring includes an integral retainer portion which engages an annular groove spaced from the end of the connector to retain the sealing ring in the groove. The diaphragm supports a valve member that is adapted to engage the sealing ring, and a spring in the second chamber urges said valve member against the sealing ring.

5 Claims, 4 Drawing Figures

FIG. 1
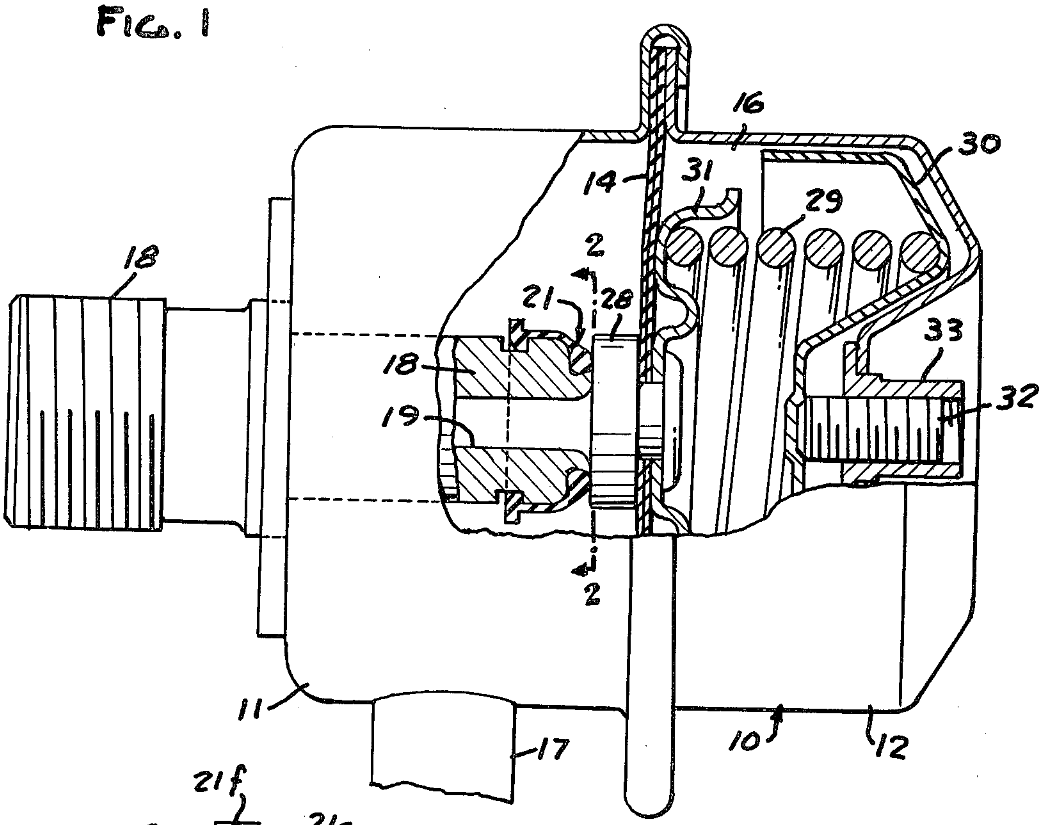
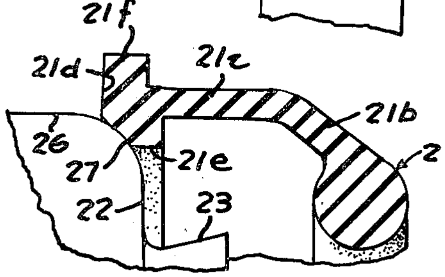
FIG. 4
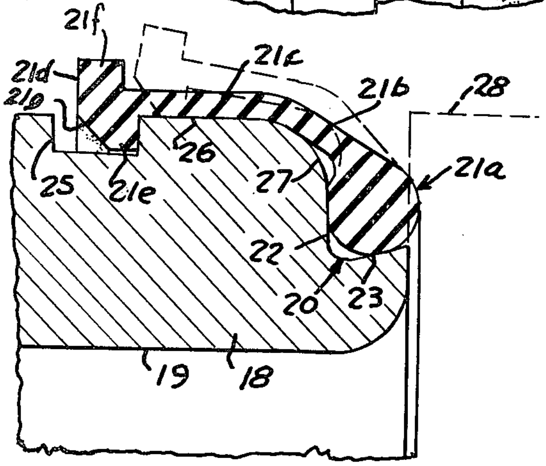
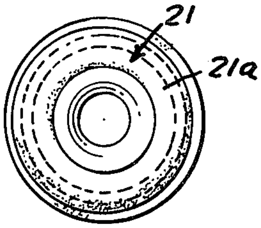
FIG. 2
FIG. 3

FUEL PRESSURE REGULATOR ASSEMBLY

This invention relates to fuel pressure regulator assemblies.

BACKGROUND AND SUMMARY OF THE INVENTION

In connection with the accurate control of fuels for internal combustion engine utilized in automobiles, it has become a common practice to utilize a fuel pressure regulator assembly. Such a device commonly includes a spring loaded diaphragm which function against a flat surface in a metal-to-metal contact to control the pressure of the fuel that is permitted to flow to the system.

In such a device, it is important to have an accurate control as well as a positive shut-off when the pressure is insufficient.

In the United States application Ser. No. 831,591 filed Sept. 8, 1977, now abandoned, having a common assignee with the present application there is disclosed a fuel pressure regulator assembly having a sealing ring on the connector.

The present invention is directed to a fuel pressure regulator assembly incorporating improved construction for controlling and shutting off the flow of fuel wherein the sealing ring includes an integral retainer portion to retain the sealing ring in position on the connector.

In accordance with the invention the fuel pressure regulator assembly comprises a housing and a diaphragm seperating said housing into a first and second chamber. The housing has a radial inlet extending to the first chamber and a connector having an axial outlet is mounted in the housing and extends axially into the first chamber. The connector has an annular groove adjacent its inner end that faces radially outwardly and a sealing ring is positioned in the groove. The sealing ring includes an integral retainer portion which engages an annular groove spaced from the end of the connector to retain the sealing ring in the groove. The diaphragm supports a valve member that is adapted to engage the sealing ring, and a spring in the second chamber urges said valve member against the sealing ring.

DESCRIPTION OF THE DRAWINGS

FIG. 1 is a part sectional view of a fuel pressure regulator assembly embodying the invention;

FIG. 2 is a view taken along the line 2—2 in FIG. 1;

FIG. 3 is a fragmentary sectional view on an enlarged scale of a portion of the fuel pressure regulator assembly shown in FIG. 1;

FIG. 4 is a view similar to FIG. 3 showing the relative position of parts during assembly.

DESCRIPTION

Referring to FIG. 1, the fuel pressure regulator assembly embodying the invention comprises a housing 10 including two housing parts 11,12 joined together by crimping part 11 and part 12 which also crimps and holds diaphragms 14 dividing the housing into a first chamber 15 and a second chamber 16. An inlet 17, in the form of a pipe, extends to the first chamber 15 for providing fuel to the chamber 15. A connector 18 is provided in the housing part 11 and extends axially and includes an axial opening 19 defining an outlet.

Referring to FIG. 3, the end of the connector 18 is formed with an annular groove 20.

A generally tubular sealing member 21 of resilient material such as rubber includes an integral O-ring 21*a* that seats in groove 20. The groove 20 opens radially outwardly and is formed by a shoulder that includes a first flat annular radial surface 22, a second annular surface 23 forming an acute angle with the surface 22 and extending radially and axially outwardly toward the free end of the connector 18 and a curved connecting portion 24 between surfaces 22,23 having a lesser radius than the cross sectional diameter O-ring portion 21*a*. The dimensions are such that when the O-ring 21*a* is in position, a portion of the O-ring portion 21*a* extends axially beyond the end of the connector 18.

Sealing member 21 includes a tubular portion including an integral inclined portion 21*b* that extends axially and radially outwardly from O-ring portion 21*a* to a cylindrical portion 21*c* which terminates an end portion 21*d* that, in turn has an integral radially inwardly directed rib 21*e* and a peripheral lip 21*f* extending radially outwardly. The connector 18 includes an annular rectangular shaped groove 25 that is engaged by rib 21*e*.

The axial distance between the groove 20 and groove 25 on connector 18 is greater than the distance between the O-ring portion 21*a* and rib 21 so that the sealing member is axially in tension when in position. In addition, the inner diameter of cylindrical portion 21*c* is slightly less than the corresponding portion 26 of connector 18 so that the sealing member 21 is also radially tensioned. The rib 21*e* preferably includes an inclined surface 21*g* to facilitate positioning of sealing ring 21. In addition, the area of juncture 27 between surface 22 and surface 26 is curved.

The diaphragms 14 support a valve 28 which has a flat radial surface that is adapted to contact the O-ring portion 21*a*. A coil spring 29 is interposed between a guide member 30 and a washer 31 to yieldingly urge the diaphragm and in turn the valve 28 against the O-ring portion 21*a*. A screw 32 is threaded into a fitting 33 in the housing part 12 and engages the guide member 30 so that the tension of the spring 29 on the diaphragm can be adjusted.

In use, fuel enters through pipe 17 into chamber 15 and if the pressure of the fuel is sufficient, the diaphragm 14 is moved outwardly in turn moving the valve 28 away from the O-ring portion 21*a* and permitting the fuel to flow axially outwardly through the opening 19. When the fuel pressure is insufficient, the diaphragm 14 is moved axially bringing the valve 28 into engagement with the O-ring portion 21*a* and positively cutting off the fuel without leakage.

I claim:

1. A fuel pressure regulator assembly comprising,
   a housing,
   a diaphragm separating said housing into a first and second chamber,
   said housing having a radial inlet extending to said first chamber,
   a connector mounted in said housing and extending axially into said first chamber,
   said connector having an axial outlet,
   a sealing member of resilient material,
   an annular groove adjacent its inner end,
   said groove facing radially outwardly,
   said sealing member having an O-ring portion positioned in said groove, such that a portion of said sealing ring projects axially beyond said connector,
   said sealing member including an integral tubular portion extending from said ring position, said connector having another annular groove spaced from the end of said connector, said sealing member having a radially inwardly extending rib extending from said tubular portion into said last mentioned groove of said connector, said diaphragm having a valve member adapted to engage said O-ring portion, and spring means in said second chamber urging said valve member against said O-ring portion.

2. The combination set forth in claim 1 wherein the axial distance between the end of the connector and said last mentioned groove in said connector is greater than said O-ring portion and said radially inwardly extending rib.

3. The combination set forth in claim 2 wherein at least a portion of said tubular portion of said sealing member has an inner diameter less than the corresponding surface of the connector when the sealing member is in position.

4. The combination set forth in claim 1 wherein said tubular portion includes a first portion extending axially and radially outwardly from said O-ring portion and a second cylindrical portion extending axially from said first portion to said rib.

5. The combination set forth in claim 4 wherein the portion of said connector contacted by said first portion of said sealing member is curved.

* * * * *